Jan. 2, 1923.
F. J. COWIE.
INDICATING MEANS FOR AUTOMOBILE GASOLINE TANKS.
FILED MAR. 31, 1922.
1,440,447
2 SHEETS-SHEET 1
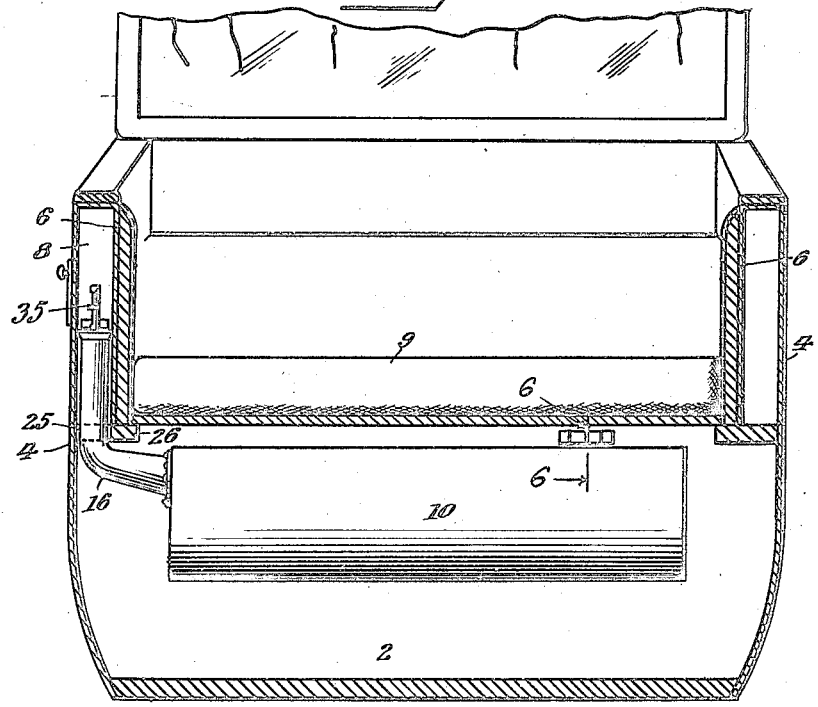
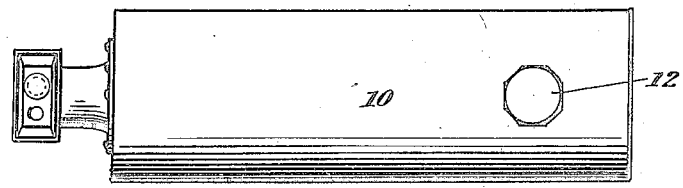
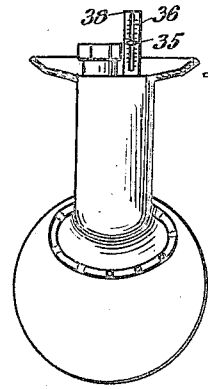
Inventor
F. J. Cowie
By William J. Jacobi
Attorney Jan. 2, 1923.
F. J. COWIE.
INDICATING MEANS FOR AUTOMOBILE GASOLINE TANKS.
FILED MAR. 31, 1922.
1,440,447
2 SHEETS-SHEET 2
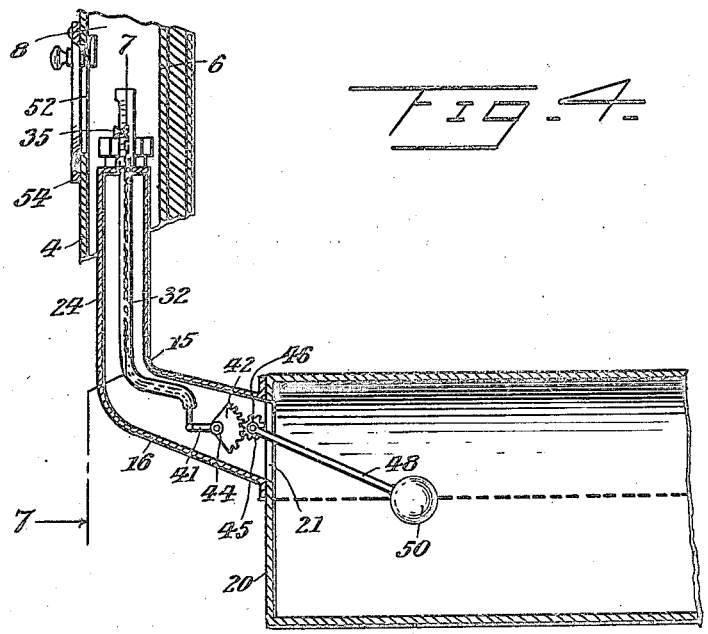
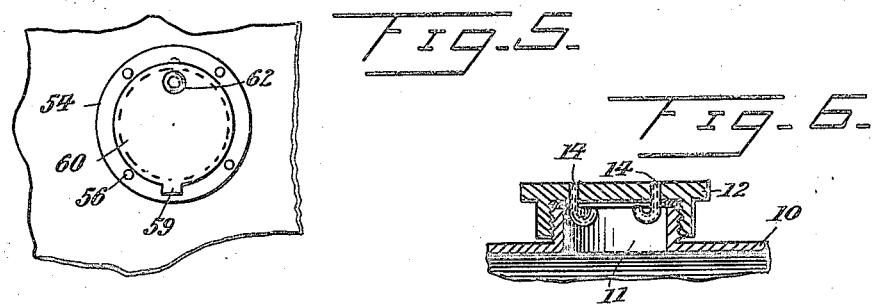
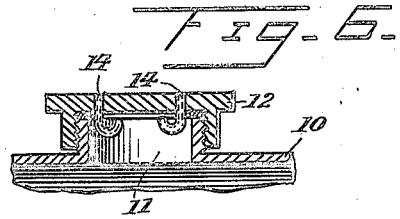
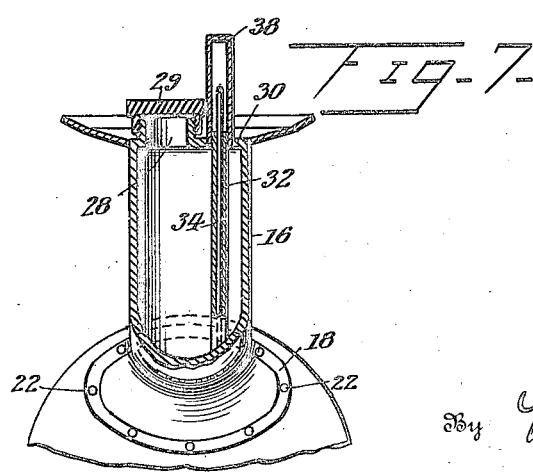
Inventor
F. J. Cowie
By William J. Jacobi
Attorney Patented Jan. 2, 1923.

1,440,447

UNITED STATES PATENT OFFICE.

FLOYD J. COWIE, OF SANDUSKY, OHIO.

INDICATING MEANS FOR AUTOMOBILE GASOLINE TANKS.

Application filed March 31, 1922. Serial No. 548,441.

*To all whom it may concern:*

Be it known that FLOYD J. COWIE, a citizen of the United States, residing at Sandusky, in the county of Erie and State of Ohio, has invented certain new and useful Improvements in Indicating Means for Automobile Gasoline Tanks, of which the following is a specification.

My invention relates to automobile gasoline tank filling and level indicating means, and particularly first, to a filling spout especially for use with tanks which are arranged beneath the seat of the vehicle as in the case of Ford automobiles, and second, to a visual indicating means whereby the level of the gasoline within the tank may be observed by an external gauge, without the necessity of removing the seat cushion, and inserting a measuring rod into the filling opening.

One of the particular features of my invention resides in an arrangement of a filling spout, preferably secured to the end of the gasoline tank, wherein said spout is accessible for filling, from the side of the vehicle, and preferably the side to the left of the driver, and which spout is housed or normally concealed from view between the side walls of the body of the vehicle.

A further feature resides in the combination with said filling spout, of a visual liquid level indicator which is in the form of a vertically movable indicating finger cooperating with a graduated scale, controlled by a float within the tank and operably connected with the gauge finger by a flexible driving cable passing through the filling spout.

A further feature resides in the provision of a gauge, the indicating portions of which are coated with a luminous composition or paint so that the readings may be observed in the night.

In the drawings which form a part of this specification,—

Figure 1 is a vertical sectional view taken through an automobile body, of the Ford type, in proximity to the front seat, and looking toward the front of the vehicle;

Figure 2 is a plan view of a tank equipped with the filling spout, removed from the vehicle;

Figure 3 is an end view from the left of the tank and spout;

Figure 4 is a vertical sectional view of the tank, filling spout, and a portion of the vehicle body, and illustrating more in detail the relation of the spout to the said body;

Figure 5 is a side view of a portion of the outer wall of a vehicle body and a cover for the opening which affords access to the spout and gauge;

Figure 6 is a vertical sectional view through the vent cap of the tank on the line 6—6 of Figure 1; and Figure 7 is a vertical sectional view through the filling spout and gauge on the line 7—7 of Figure 4.

Referring now more specifically to the drawings by numerals of reference, wherein the characters designate like parts throughout the several figures, 2 indicates an automobile body, here shown as of the Ford type, although it is readily understood that the particular make of vehicle is immaterial, the invention being adaptable to any type where the gasoline tank is arranged beneath the seat, whether it be at the front or back. In fact, the invention is applicable for use with any automobile where the tank is confined within the body, as distinguished from the type where the tank is located externally of the vehicle, which is usually at the rear.

The exterior side walls of the body which are of sheet metal are shown at 4, the interior walls which are spaced therefrom being shown at 6, and providing thereby a recess 8, usual in substantially all types of automobiles, so further reference to structural details appertaining thereto is here unnecessary.

Housed beneath the seat 9, and supported by means common to all Ford automobiles, unnecessary to here be shown, is a gasoline tank 10, of the usual size and shape and provided in one end, with an opening 11 over which is secured a threaded or screw cap 12 provided with vent tubes 14 extending through the top of the cap and whereby the liquid within the tank is maintained at atmospheric pressure.

On preferably the left hand end of the tank 10, with refernce to the view shown in Figure 1, I mount a filling spout 15, the lower section 16 of which is provided with a flange 18 attached to the end wall 20 around an opening 21 therein, by spot welding, rivets or other suitable fastening means 22. It will be observed that the section 16 is inclined downwardly toward the opening 21.

The upper section 24 is substantially vertical, forming with the section 16, an elbow, the said vertical section extending through an aperture 25 in the body frame member 26 and into the recess 8 provided between the inner and outer walls 4 and 6.

Referring particularly to Figure 7, it will be seen that the upper end of the vertical section 16, is provided with a filling opening 28 closed by a screw cap 29, said section 16 being of sufficient cross-sectional area to permit of a filling opening of a size capable of receiving the standard nozzle on the hose of the usual gasoline service stations. This cross-sectional area must also be sufficient to permit of the location within the section 16 of the gauge operating cable and housing presently to be described. The upper portion of the section 16 is further provided with an annular flange which centers it with respect to the adjacent walls 4 and 6 and presents relative movement with respect thereto, or in other words, steadying it against lateral vibrations.

Extending vertically through the section 24 of the filling spout and rigidly secured at its upper end in the top wall 30 is a metal tube 32 preferably of copper having its lower portion suitably bent to conform to the general shape of the lower section 16, said tube, as shown, being laterally offset with respect to the filling opening 28 to avoid interference of the operations of each.

Arranged within the tube 32 is a flexible shaft 34, its upper end extending beyond the upper end of said tube and being provided with a luminous indicating pointer 35 which cooperates with the luminous scale markings 36 on a gauge plate formed at the front of a housing cap or guard 38, to indicate the level of the gasoline within the tank.

The lower extremity of the flexible shaft projects beyond the lower end of the tube 32 and is pivotally connected at 40 with an arm 41 of a segmental gear 42 suitably pivoted at 44 within the spout section 16. The gear 42 meshes with a pinion 45 pivoted on a shaft 46 arranged transversely of the section 16, which pinion 45 has rigidly secured thereto, an arm 48 to the free end of which is attached a float 50, which rising or falling with the level of the gasoline indicated at $x$, through the gear and flexible shaft mechanism operates the gauge or indicating pointer 35. The spout opening is accessible for filling and the gauge visible, through a circular aperture 52 cut in the outer wall 4 of the body. Attached to the outer face of the wall 4 and surrounding said aperture 52 is a flat ring or annulus 54 secured in position by rivets or the like 56, to the lower portion of which ring is hinged at 59, a door 60 adapted to be fastened when closed by a latch 62.

It is believed that a full and clear understanding of the construction and operation of my invention will be had from the foregoing.

What I claim as my invention is the following:

1. In an apparatus of the class described, the combination with a vehicle body having spaced side walls providing a recess therebetween, the outer of said walls having an aperture therein; a fuel tank, a filling spout connected therewith, having its upper end arranged adjacent said opening in the outer wall, and provided with a filling opening, a graduated scale plate carried by the upper end of said spout and in proximity to said opening in the side wall, a tube supported by and extending through said spout, a gauge finger cooperating with said scale, a flexible shaft extending through said tube and carrying said gauge finger, a float arranged within said tank, and operating means connecting said float and said flexible shaft.

2. In an apparatus of the class described, the combination with a vehicle body having spaced side walls the outer wall being provided with an aperture and a closure for said aperture, a tank, a filling spout attached to said tank and provided with a lower section having an inclined bottom portion, an upper vertical section arranged at an angle to said lower section and having a filling opening adjacent the aperture in the body wall, a gauge rod tube secured within said filling spout and offset from the axis thereof, a gauge plate on said vertical section of the filling spout and in proximity to the aperture in the body wall, a float within said tank, and means connected with said float and cooperating with said gauge plate for indicating the level of the liquid within said tank.

3. In an apparatus of the class described, the combination with a vehicle body having spaced side walls providing a recess therebetween, the outer of said walls having an aperture communicating with said recess, a fuel tank, a filling spout connected therewith, having its upper end arranged adjacent said aperture in the side wall of the body, said filling spout being provided with a filling opening and a liquid level indicating device carried by said filling spout and arranged in proximity to the aperture in the outer side wall.

In testimony whereof I affix my signature.

FLOYD J. COWIE.